(12) United States Patent
Vaidyanathan

(10) Patent No.: US 11,374,530 B2
(45) Date of Patent: Jun. 28, 2022

(54) BRACKETS FOR MINIMAL PENETRATION MODULAR ROOF-TOP MOUNTING RACKS AND SOLAR PHOTOVOLTAIC SYSTEMS AND METHOD FOR USING THE BRACKETS

(71) Applicant: Chandramouli Vaidyanathan, Eagan, MN (US)

(72) Inventor: Chandramouli Vaidyanathan, Eagan, MN (US)

(*) Notice: Subject to any disclaimer, the term of this patent is extended or adjusted under 35 U.S.C. 154(b) by 76 days.

(21) Appl. No.: 16/802,062

(22) Filed: Feb. 26, 2020

(65) Prior Publication Data
US 2020/0280281 A1 Sep. 3, 2020

Related U.S. Application Data

(63) Continuation of application No. 62/810,487, filed on Feb. 26, 2019.

(51) Int. Cl.
*H02S 20/23* (2014.01)
(52) U.S. Cl.
CPC .................. *H02S 20/23* (2014.12)
(58) Field of Classification Search
CPC ..... E04H 1/00; F24J 2/52; F24J 2/5205; F24J 2/526; F24J 2/5245; F24J 2/5203; F24J 2/5252; F24J 2/5256; F24S 5/634; F24S 5/70; F24S 25/634; H02S 20/23
USPC ....................................................... 52/173.3
See application file for complete search history.

(56) References Cited

U.S. PATENT DOCUMENTS

| | | | | |
|---|---|---|---|---|
| 1,365,996 A | * | 1/1921 | Herwick | E04G 3/265 182/45 |
| 6,003,629 A | * | 12/1999 | Cloutier | E04G 3/26 182/113 |
| 8,826,608 B2 | * | 9/2014 | Vaidyanathan | F24S 25/33 52/173.3 |
| 9,257,937 B2 | * | 2/2016 | Vaidyanathan | H02S 20/23 |
| 2007/0062761 A1 | * | 3/2007 | Megna | E04G 3/26 182/45 |
| 2007/0272485 A1 | * | 11/2007 | Baake | A62B 35/0068 182/45 |
| 2008/0006481 A1 | * | 1/2008 | Vieira | E04G 5/041 182/45 |
| 2013/0219812 A1 | * | 8/2013 | Goodman | F24S 25/613 52/173.3 |
| 2014/0026946 A1 | * | 1/2014 | West | H02S 20/00 136/251 |
| 2014/0090316 A1 | * | 4/2014 | Vaidyanathan | H02S 20/23 52/173.3 |

* cited by examiner

*Primary Examiner* — Beth A Stephan
(74) *Attorney, Agent, or Firm* — Billion & Armitage

(57) ABSTRACT

A modular, roof-mounted solar energy apparatus includes a mounting frame having a plurality of brackets. Each bracket having a first arm connected to a second arm at a connection point. The plurality of first arms form a first plane. The plurality of second arms form a second plane. Solar panels populate the planes. Also, there are ridge brackets and hip brackets for connecting various mounting frame portions over a ridgeline of a roof and across a hip of a hip roof.

5 Claims, 18 Drawing Sheets

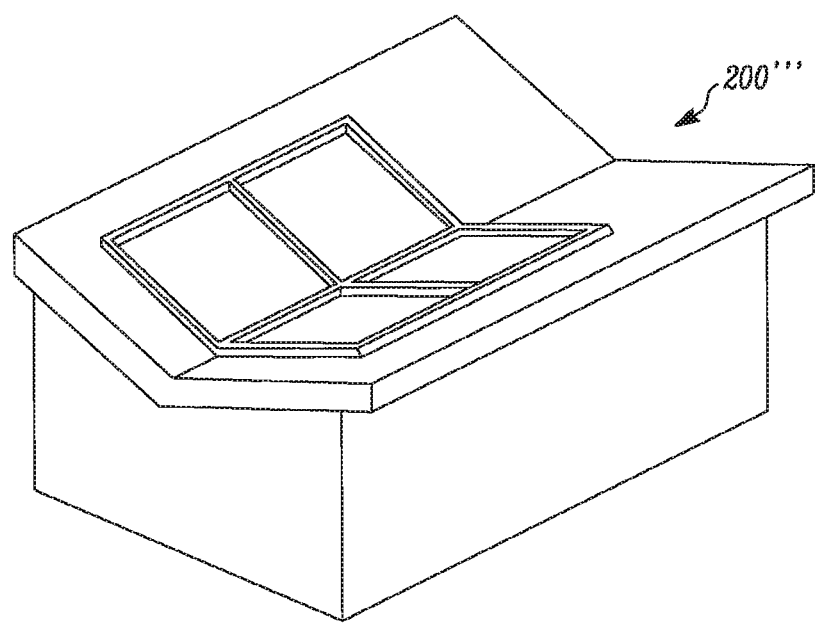
FIG. 2A''''

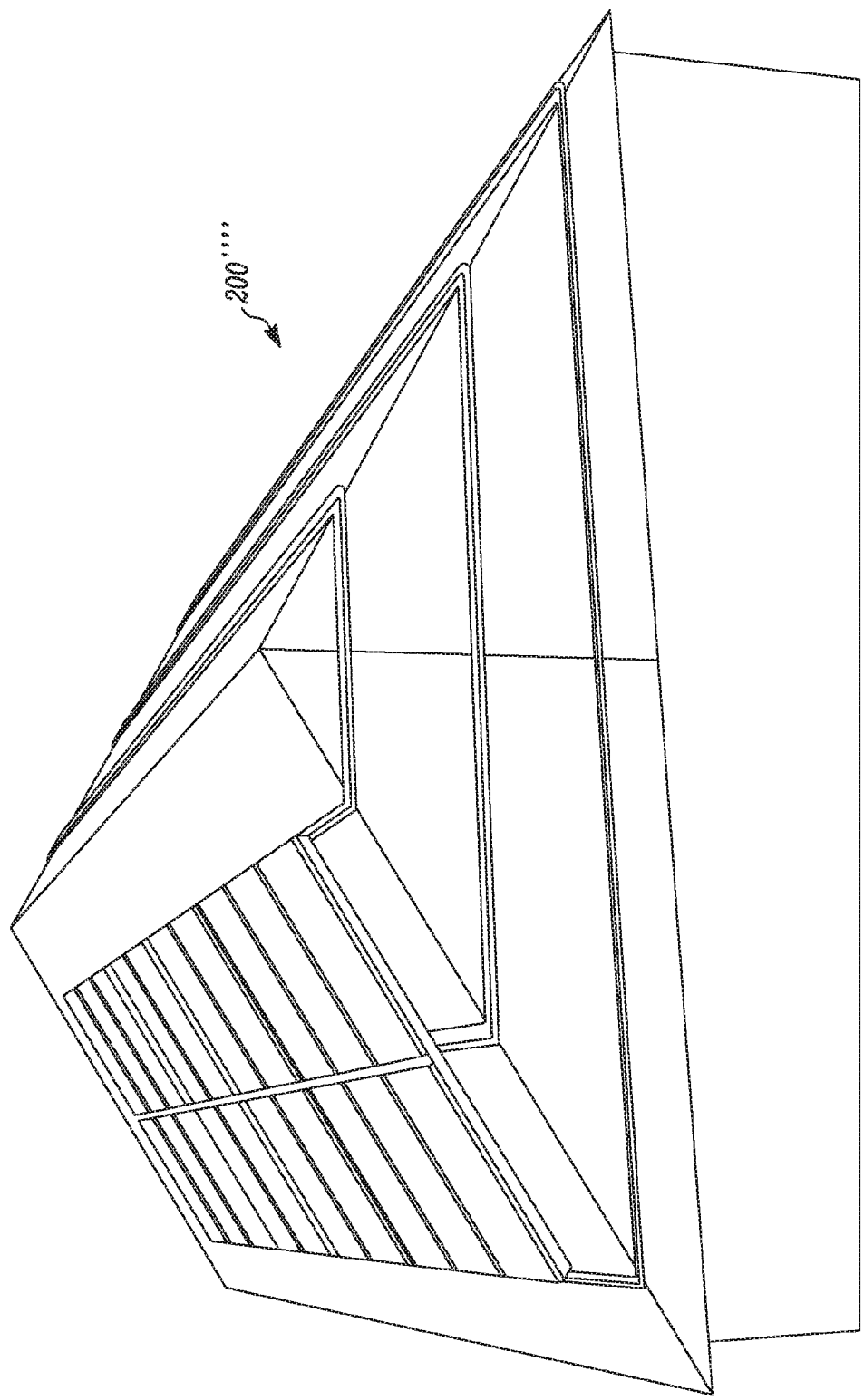

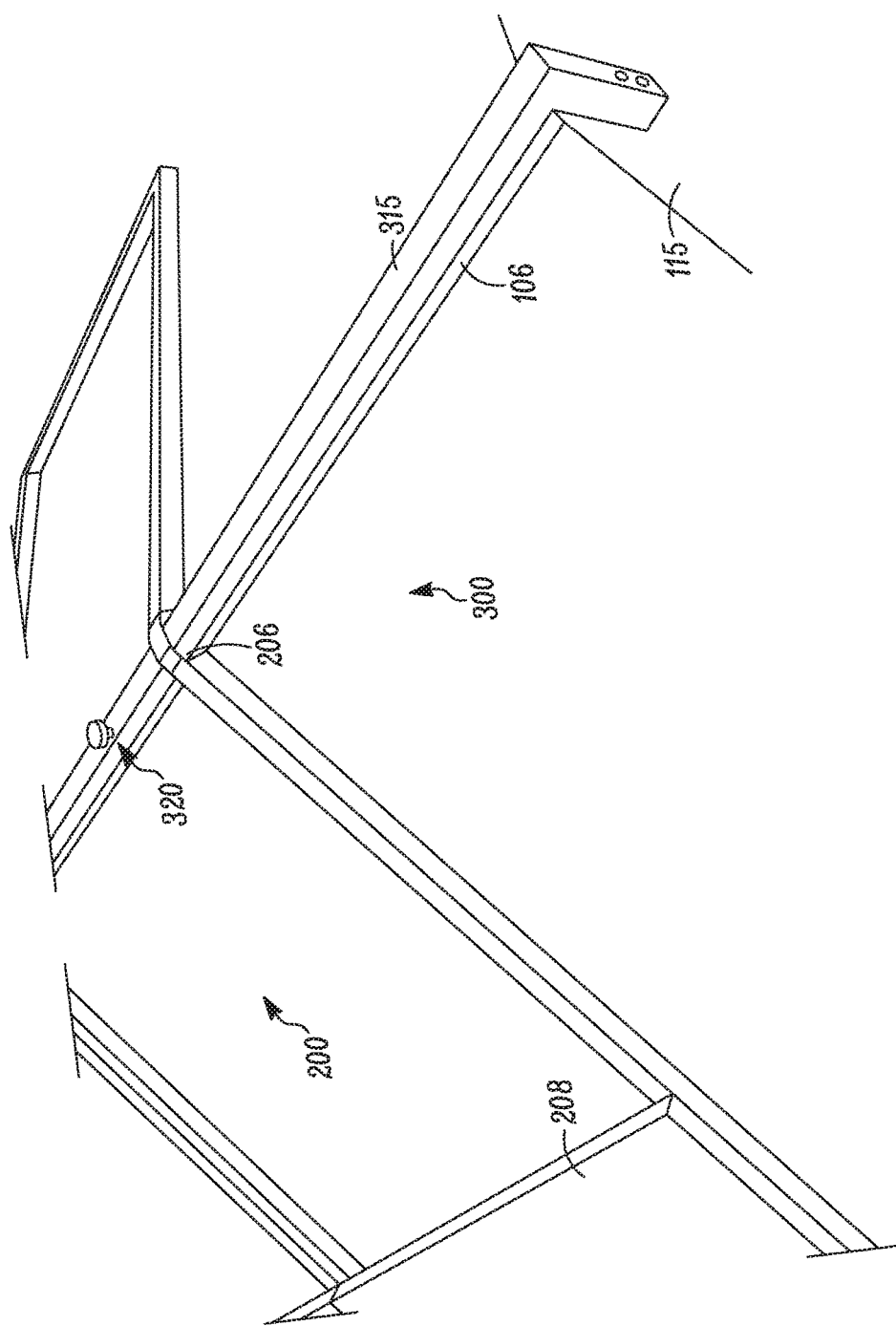

| PITCH | A1 | A2 |
|-------|------|-------|
| 2/12  | 9.5  | 161   |
| 4/12  | 18.4 | 143.2 |
| 6/12  | 26.6 | 126.8 |
| 7/12  | 30.3 | 119.5 |
| 8/12  | 33.7 | 112.6 |
| 10/12 | 39.8 | 100.3 |
| 12/12 | 45   | 90    |
| 14/12 | 49.4 | 81.2  |
| 16/12 | 53.1 | 73.8  |
| 18/12 | 56.3 | 67.4  |

*FIG. 5K*

BRACKETS FOR MINIMAL PENETRATION MODULAR ROOF-TOP MOUNTING RACKS AND SOLAR PHOTOVOLTAIC SYSTEMS AND METHOD FOR USING THE BRACKETS

CROSS-REFERENCE TO RELATED APPLICATIONS

This application is claims priority under 35 U.S.C. § 119(e) to U.S. Provisional Patent Application No. 62/810,487, filed on 26 Oct. 2019, the contents of which are incorporated herein by reference in their entirety. A claim of priority is made.

BACKGROUND

Electrical power generation units, for example renewable energy systems such as solar photovoltaic systems, may be connected to an electrical utility grid or act as stand-alone power generation units and have become popular with home and business owners. It is common for customers to purchase solar photovoltaic systems for both purposes, such systems being most commonly installed on rooftops. Basic roof top solar photovoltaic systems involve one or more standardized solar panels which are attached to or integrated with mounting racks. Solar photovoltaic systems, including the solar photovoltaic panels, inverter, and mounting racks are designed and installed by providers, and typically must be customized for particular customers. The number of panels per system, electrical connections between individual panels, power-consuming devices, and the electric utility grid, zoning conditions, and installation site accessibility, among other factors, can significantly increase system prices.

Roof installation involves anchoring the system at a number of points throughout, requiring penetration at a number of anchor points. Each anchoring point 100, such as the one shown in FIG. 1, typically employs a lag bolt 101 or similar fastening element which penetrates all layers of the roof 110, which may include shingles, tar or felt paper, ice guard, the roof deck, flashing, and ridge caps, decreasing the sealing integrity of the roof. Anchoring point fasteners ideally, and often must, further penetrate roof rafters or trusses 111 for added strength against high winds and other elements, further increasing installation costs.

Further, roof construction, replacement, and overall life spans will not necessarily coincide with a solar photovoltaic system installation's lifespan, or a roof may become damaged by hail, falling trees or other like occurrences that will necessitate replacement or repair of the roof. In the event of such occurrences, roof-penetrating anchoring systems may need to be uninstalled and reinstalled a number of times, thereby detrimentally affecting overall system economics.

SUMMARY

Embodiments of the invention relate to modular roof-top mounting frames which require minimal or no penetration for rooftop installation and are capable or accepting solar panels or may be integrated into plug-and-play solar photovoltaic systems. Mounting frames may comprise a plurality of hinged brackets each having a first arm and a second arm connected at hinge point. When the plurality of hinged brackets are aligned or connected, the plurality of first arms align to substantially form a first plane and the plurality of second arms align to substantially form a second plane. One or more photovoltaic solar panels may be mounted throughout the first plane, throughout the second plane, or throughout both the first plane and throughout the second plane.

Solar photovoltaic systems which incorporate various embodiments of mounting frames described herein may further comprise one or more solar panels, an electrical power generation unit, a power inverter, and a power outlet, which may be connectible to energy storage units, electrically-powered devices, or an electric utility grid.

BRIEF DESCRIPTION OF THE DRAWINGS

The accompanying drawings illustrate non-limiting example embodiments of the invention.

FIG. 3 is a perspective view of gable-penetrating mounting frame, according to some embodiments.

FIG. 5K is a table of roof pitch and associated angles A1 and A2, according to some embodiments.

DETAILED DESCRIPTION

Figure 1:
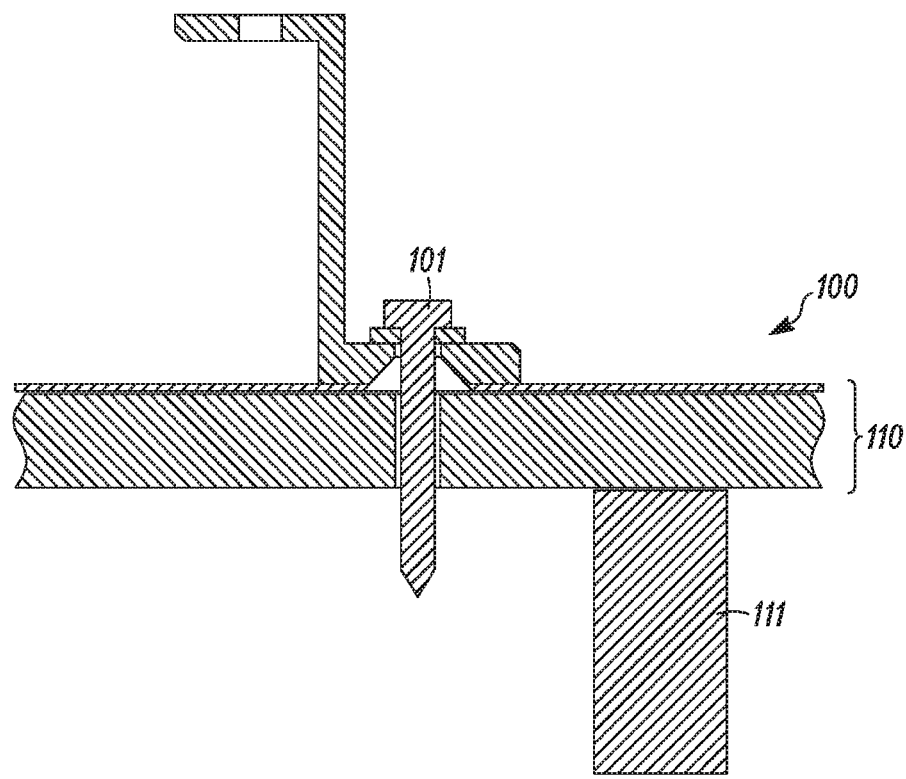
FIG. 1 is a cross-sectional side view of a roof-penetrating anchor, according to the prior art.

Embodiments of the invention relate to modular roof-top mounting frames which require minimal or no penetration for rooftop installation and are capable of accepting solar panels or may be integrated into plug-and-play solar photovoltaic systems. Mounting frames may comprise a plurality of hinged brackets each having a first arm and a second arm connected at hinge point. When the plurality of hinged brackets are aligned or connected, the plurality of first arms align to substantially form a first plane and the plurality of second arms align to substantially form a second plane. One or more photovoltaic solar panels may be mounted throughout the first plane, throughout the second plane, or throughout both the first plane and throughout the second plane.

Solar photovoltaic systems which incorporate various embodiments of mounting frames described herein may further comprise one or more solar panels, an electrical power generation unit, a power inverter, and a power outlet, which may be connectible to energy storage units, electrically-powered devices, or an electric utility grid.

Throughout the following description, specific details are set forth in order to provide a more thorough understanding of the invention. However, the invention may be practiced without these particulars. In other instances, well known elements have not been shown or described in detail in order to avoid unnecessarily obscuring the invention. The drawings show, by way of illustration, specific embodiments in which the invention may be practiced. These embodiments may be combined, other elements may be utilized, or structural or logical changes may be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more". In this document, the term "or" is used to refer to a nonexclusive or, such that "A, B or C" includes "A only", "B only", "C only", "A and B", "B and C", "A and C", and "A, B and C", unless otherwise indicated. The terms "above" and "below" are used to describe two different directions in relation to the center of a composite and the terms "upper" and "lower" may be used to describe two different surfaces of a composite. In the appended aspects or claims, the terms "first", "second" and "third", etc. are used merely as labels, and are not intended to impose numerical requirements on their objects.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range.

Figure 2A:
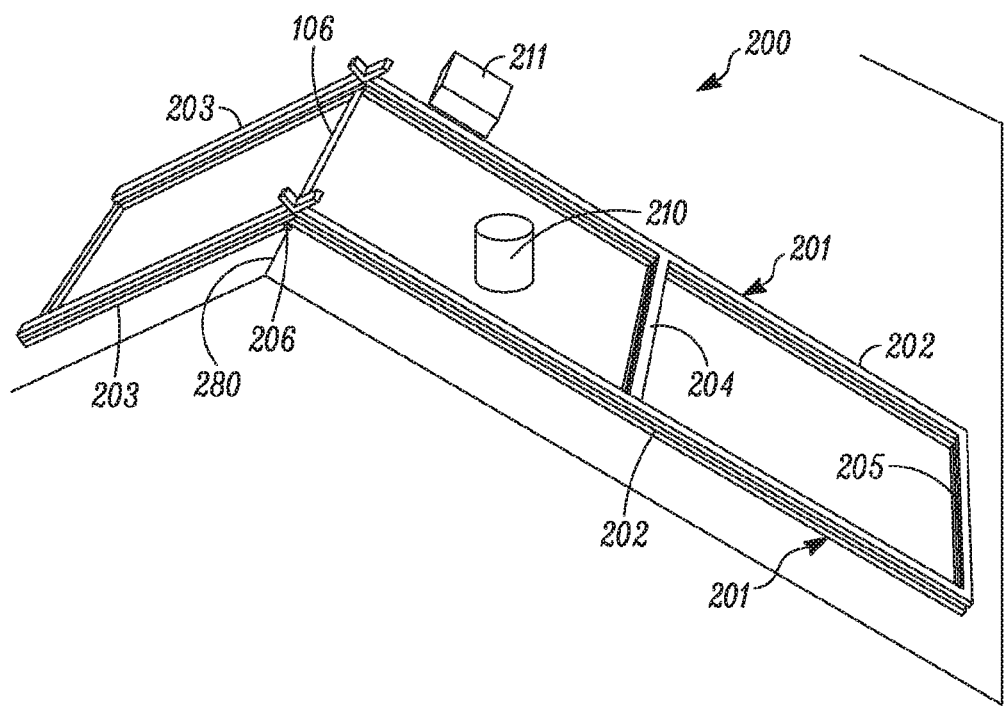
FIGS. 2A-2A"" show perspective views of modular mounting frames positioned at a roof line.
Figure 2A:
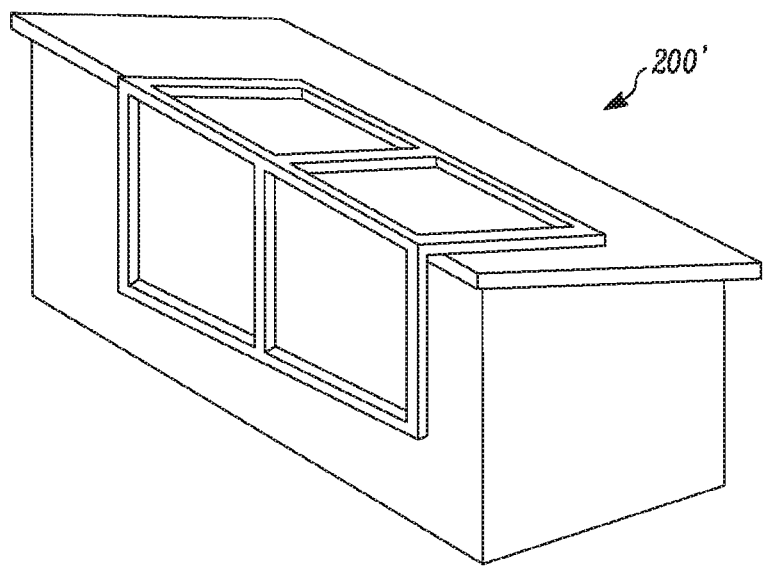
Figure 2A:
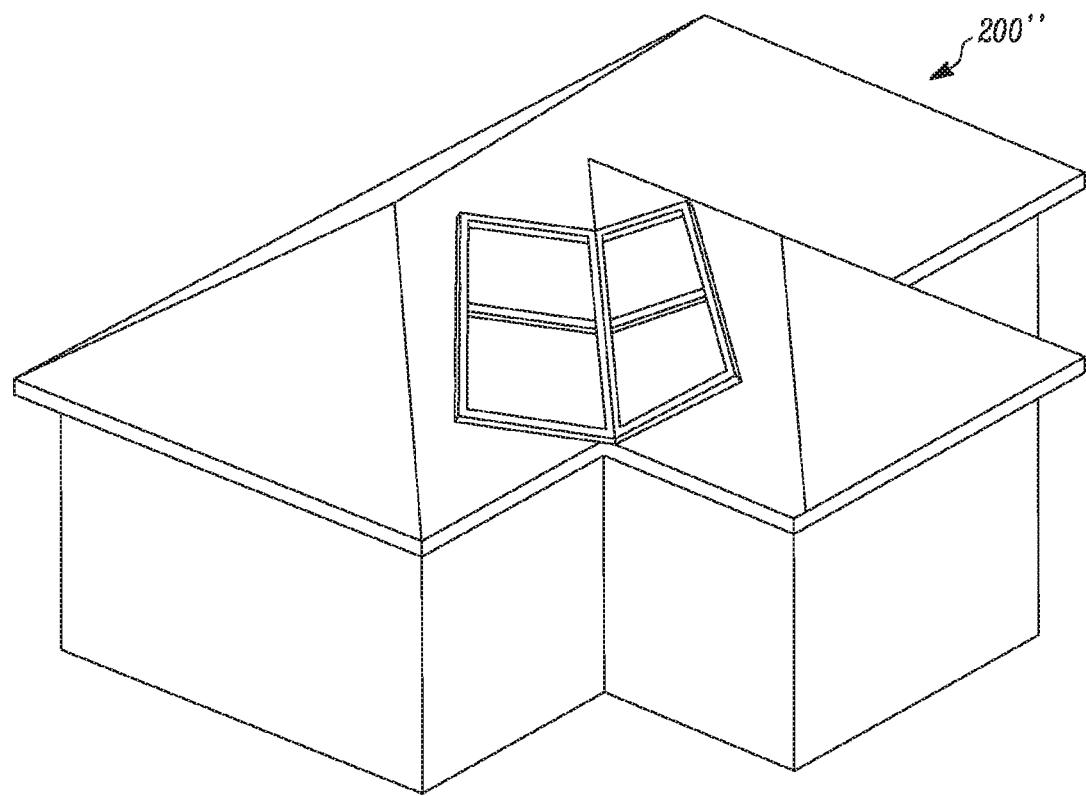
Figure 2B:
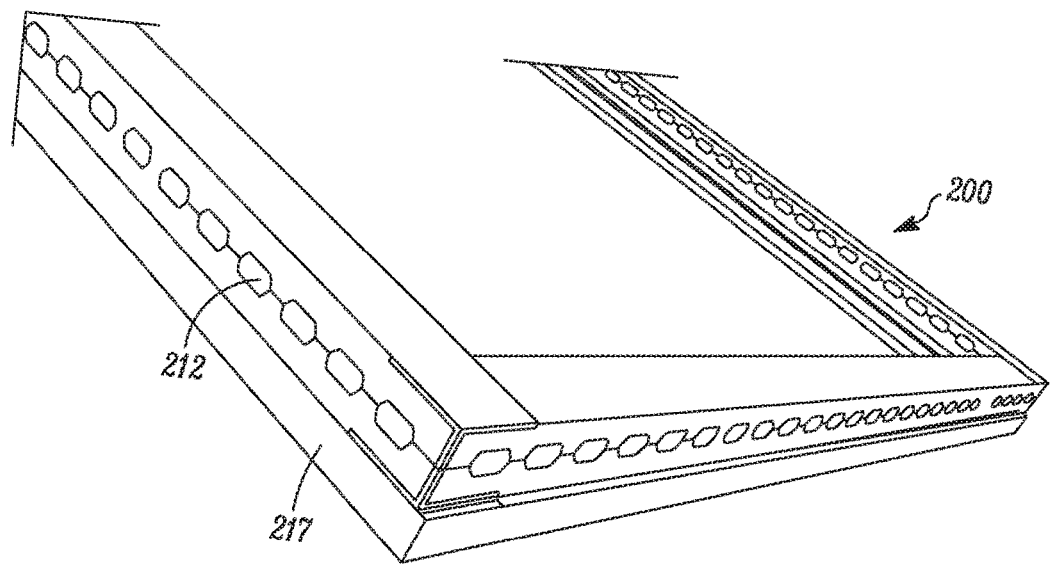
FIG. 2B is a perspective view of a mounting frame having holes spaced throughout its arms and end caps.

Mounting frames as described herein may refer to stand-alone frames or integrated components of solar photovoltaic power systems. FIG. 2A depicts a basic modular mounting frame 200, comprising two hinged brackets 201. Each bracket has a first arm 202 and a second arm 203, connected by a hinge 206. Hinges 206 may be adjusted on-site and locked into position so as to place a compression load on a rooftop. FIG. 2E shows a zoomed-in view of hinge 206, and bolt 207 used for adjusting and locking the hinge 207 according to some embodiments. Adjustable hinges allow the system to be adjusted for irregular rooftop surfaces, marginal differences in shingle thickness, and other non-uniformities. In some embodiments the first arm 202 and second arm 203 are connected via welding or other immovable mechanical means such as bolts. Embodiments may also include perpendicular cross beams 204 and end caps 205, as shown in FIG. 2A, to enhance the structural integrity, provide additional mounting surface for solar panels, or to provide wind-blocking protection. Perpendicular cross beams may be positioned anywhere throughout the lengths of the firm arms 202 or second arms 203 and may also connect at the hinges 206. The hinges 206 or connection points of each bracket are positioned proximate to a roof line 106 as shown in FIG. 2A and maintained in position by the weight of the mounting frame or overall solar photovoltaic system. A roof line may be a roof peak, a roof valley, or a roof edge. FIG. 2A' shows a mounting frame 200' positioned at a roof edge. FIG. 2A" shows a mounting frame 200" positioned at a roof valley. FIG. 2A'" shows a mounting frame 200'" positioned at a roof valley. FIG. 2A"" shows a mounting frame 200"" positioned at a roof edge.

When multiple hinged brackets are combined, the two first arms align to substantially form a plane, on which solar panels may be mounted. The second arms align to substantially form a plane, on which solar panels may also be mounted. One or more solar panels may be mounted on the first plane, on the second plane, or on both planes. Mounting frames will often contain solar panels on the first plane, or the second plane, depending on the orientation to the sun. The first arms and second arms may be lengthened or shortened to accommodate for more or larger solar panels, available rooftop space, rooftop shape, or ballasting concerns. FIG. 2D shows an embodiment of an adjustable arm 213. All first arms need not be the same length, and all second arms need not be the same length. For example, a particular mounting frame may have 4 hinged brackets, wherein two adjacent first arms are each 10 feet long and two adjacent first arms are each 15 feet long. In this particular example embodiment, the second arms may be any length, for example 5 feet. Similarly, first arms and second arms need not be the same length, as shown in FIG. 2A.

The embodiments disclosed herein may be advantageously mounted to a rooftop without penetrating any layers of the roof, thereby avoiding damage to the rooftop and minimizing installation costs. Adhesive 217, as shown in FIG. 2B, may be used to secure the mounting frame to a rooftop, and also prevent wind flow between the mounting frame and the roof, or between the roof and any solar panels attached to or integrated with the mounting frame. In some embodiments, the adhesive 217 will have a coefficient of thermal expansion value between the coefficient of thermal expansion of the contacting roof surface and the coefficient of thermal expansion of the contacting mounting frame surface. In some embodiments the adhesive 217 is butyl rubber.

Figure 2C:
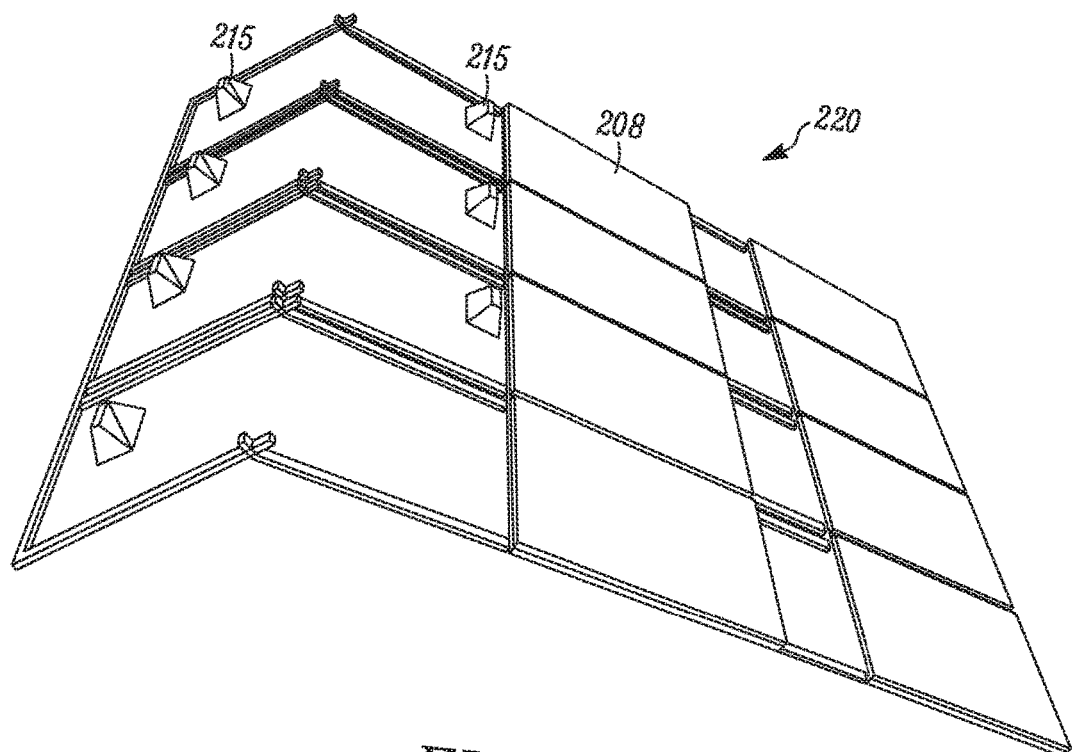
FIG. 2C is a perspective view of a mounting frame equipped with a plurality of solar panels and mounting weights.
Figure 2D:
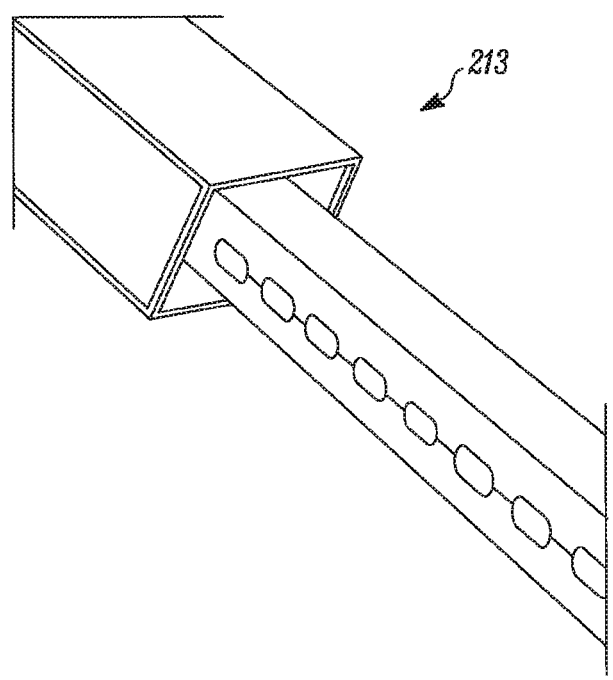
FIG. 2D is a perspective view of an adjustable arm, according to some embodiments.
Figure 2E:
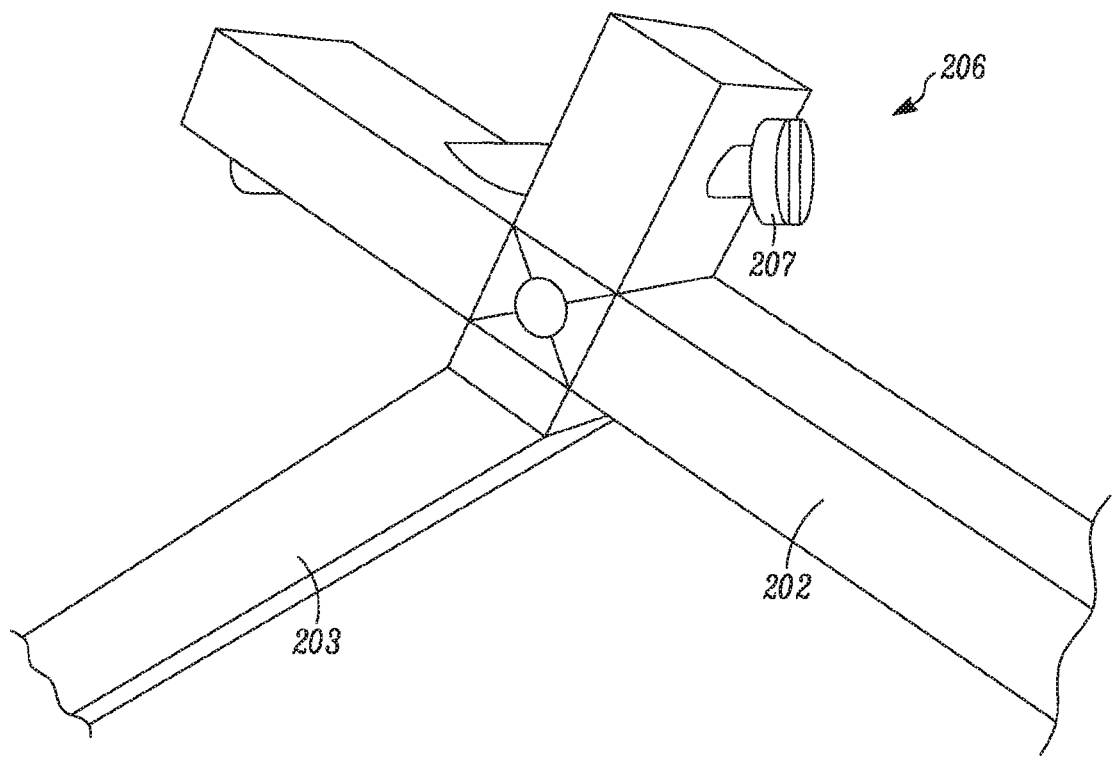
FIG. 2E is a perspective view of an adjustable and lockable hinge, according to some embodiments.

A modular design allows for a plurality of hinged brackets to be incorporated in a solar mounting frame 220, as shown in FIG. 2C. Additional hinged brackets may be added based on roof size, solar panel 208 size, structural integrity, or other concerns. The modular design also allows for quick customization of a solar photovoltaic system to any roof. For example, rooftop obstructions such as vent pipes 210, skylights 211, chimneys, or the like, may be easily avoided, as shown in FIG. 2A. Additionally, orientation of solar panels to the sun is a critical factor in power generation. The modular no-penetration and minimal-penetration systems described herein allow for versatile and easily customizable solar photovoltaic power systems to be efficiently oriented and installed to maximize power generation. The modular and no-penetration and minimal-penetration designs additionally allow for simple, cost-effective system modifications relating to power generation optimization.

Arm length may also be adjusted for ballasting concerns. The first arms, the second arms, or both the first arms and the second arms may act as ballasting arms. The arms may also be weighted to accomplish ballasting of the mounting frame. For example, where a roof gable is shallow (i.e. about 15 degrees), longer arms are required to ballast the mounting frame. Conversely, a steeper gable (i.e. about 45 degrees) will require a shorter ballasting arm. If rooftop space, rooftop shape, aesthetic concerns, or other considerations limit the length to which a ballasting arm may be extended, the ballasting arm may be weighted to compensate for any deficiency in length. Weights 215 may also be added for further stability, as shown in FIG. 2C, even where no deficiency in ballasting arm length exists. Weights may be attached directly to any part of the mounting frame or extended between the arms. For example, increased panel weight on the first plane may require additional ballasting weight on the second plane, increased length of second arms, or a combination thereof. Weights 215 may be incorporated anywhere throughout a mounting frame, as needed for ballasting.

High winds can disrupt the position of a mounting frame on a roof, particularly when a large number or solar panels are attached thereon, or a high amount of solar panel surface area is present. For example, for a mounting frame or solar photovoltaic power system positioned on a two-plane roof, or a roof with a peak edge oriented from East to West, a high wind in a North-to-South direction will create a high pressure area on the North side and a low pressure area on the South side. The pressure differential will cause the mounting frame to change positions or even lift entirely off the rooftop.

Embodiments of the mounting frame described herein provide a number of features to prevent wind-induced position disruption, such as the sealing adhesive, wind-blocking end caps, and customizable ballasting features as described above. Some embodiments further comprise a plurality of holes or openings 212, as shown in FIG. 2B. When mounting frames are integrated with solar photovoltaic power generating components, such as a power inverter, it may become necessary to provide ventilation such that necessary components are maintained at suitable temperatures or pressures. For example, a power inverter may need to be kept at ambient temperatures. Openings or holes spaced through one or more of the first arms, second arms, perpendicular cross beams, end caps, or combinations thereof reduce wind velocity to acceptable levels between the mounting frame, solar panels, or other system components while providing adequate ventilation, pressure release, or both. Acceptable levels or velocity are those that do not create lift sufficient to disrupt the position of a mounting frame. For example, a highly-ballasted mounting frame with lower solar panel surface area would have a higher acceptable wind velocity than a lesser-ballasted mounting frame with higher solar panel surface area. After careful review of the disclosure herein, one of skill in the art shall be enabled to customize a mounting frame for any particular purpose. For example, a solar photovoltaic power system operating in a high-wind, high-heat environment on a shallow roof gable may require, for example, many holes or openings throughout the hinged brackets, long first and second arms, and ballast weights. In other embodiments, holes or opening sizes may differ between various arms, perpendicular cross beams, and end caps. For example, a mounting frame having four hinged brackets may have larger holes on the inner arms and small holes on the outer arms.

In other embodiments, as shown in FIG. 3, a gable-penetrating mounting frame 300 can comprise a gable-mounted pivot-bar 315. The pivot-bar 315 would run substantially parallel to the roof line 106, with each end being mounted to opposing gables 115. The pivot-bar 315 would be rotatably attached to the mounting frame 200 at or near the plurality of hinges or arm connection points 206, thereby providing enhanced wind-induced position disruption protection, without penetration of the rooftop. One or more roof-penetrating anchoring points 320 may be required at or near the roofline depending on the length of the pivot-bar 315 and roofline 106. For example, for a roofline greater than about 20 feet, greater than about 25 feet, or greater than about 30 feet, it may be necessary to attach the center of the pivot-bar to a roof-penetrating anchor point. Other customizable features described above may obviate use of roof-penetrating anchor points for embodiments which comprise gable-mounted pivot-bars.

The mounting frames previously disclosed may be incorporated with other components to provide a roof-mountable solar photovoltaic power system. Such systems may comprise one or more solar photovoltaic panels 400 capable of generating electrical power, a power inverter 410 and a power outlet, as depicted schematically in FIGS. 4A, 4B, and 4C. The power inverter 410 may comprise a power source meter and switch, capable of converting DC power to AC power. In some embodiments the system is capable of outputting DC power, AC power, or both DC and AC power. In some embodiments the system may comprise a quick-connection point for supplying power. Power may be supplied to electrically powered devices, the power grid 440, or external energy storage units 430. In some embodiments the system includes an internal energy storage system, such as a rechargeable battery, a flywheel, a closed cycle fuel cell, or combinations thereof. The energy storage units may deliver power at a controlled or required rate and may additionally simultaneously store energy.

In some embodiments the system may comprise one or more snow removing, wiping, and cleaning devices, which may be operated or powered by battery, hand-crank, wind turbine, or other suitable means. Examples of such snow removal devices can be found in co-owned U.S. Patent Application 20110308574 A1 titled "SOLAR POWERED ELECTRICAL GENERATION DEVICE AND RELATED METHODS", the disclosure of which is herein incorporated by reference. Such optional snow removing devices 450 are shown in FIGS. 4A-C.

Figure 4A:
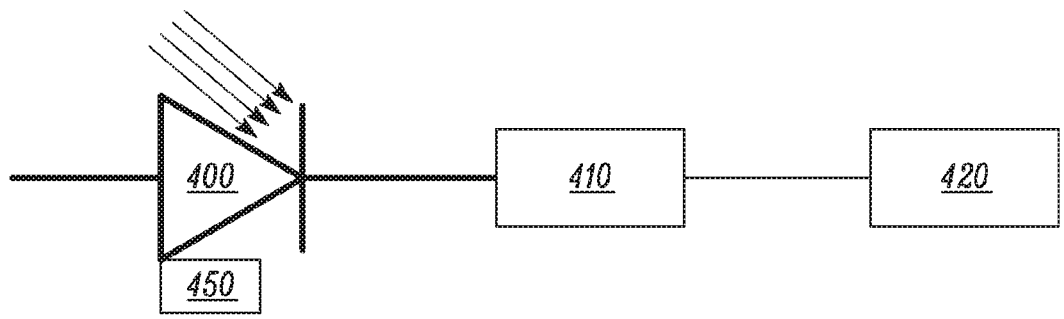
FIG. 4A is a schematic view of a solar photovoltaic power generator connected to a power source meter and switch, and a utility grid.
Figure 4B:
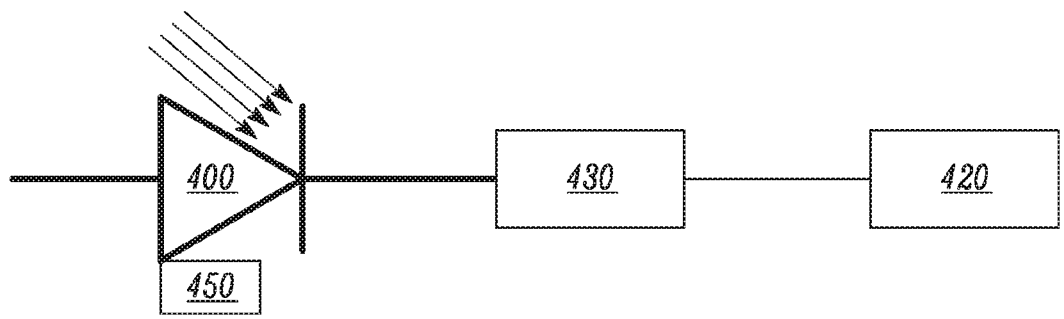
FIG. 4B is a schematic view of a solar photovoltaic power generator connected to an energy storage system and a utility grid.
Figure 4C:
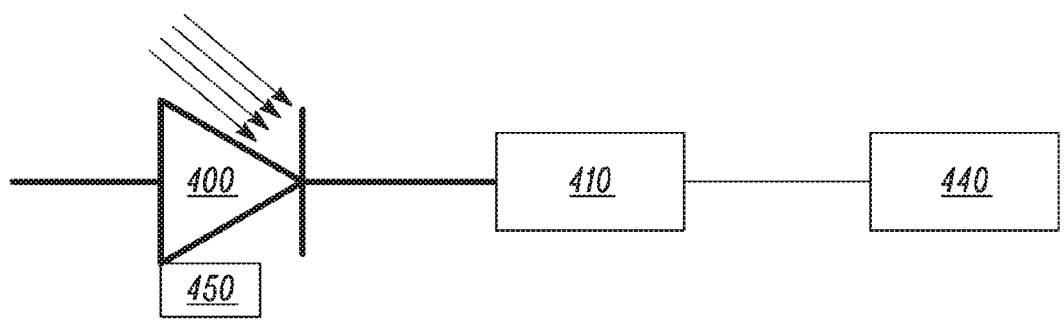
FIG. 4C is a schematic view of a solar photovoltaic power generator connected to a power source meter and switch, and a secondary power generator.

The system may deliver electrical power to an electrical utility grid 420, depicted schematically in FIG. 4A and FIG. 4B as an electrical utility conductor, through a generated power source meter and switch 410. The generated power delivery switch 410 is capable of controlling the amount of electrical power from the power source 400 delivered to the electrical utility grid 420. Some embodiments may also include a secondary power generator 440 to aid in a simulated grid connected system as in FIG. 3D. The purpose of the secondary power generator is to supply grid frequency appropriate for the power source and switch 410.

Now turning to FIG. 2A, it can be seen that the first frame member that includes a pair of first arms 202 on one side of a ridgeline 280 of a roof and includes a second frame member made from a pair of second arms 203 are connected at the ridgeline 280 of the roof. As shown in FIG. 2A, there is a hinge 206 that connects a first arm 202 to a second arm 203. There are many instances where it is necessary to connect a frame member on one side of a ridgeline 280 to another frame member on another side of the ridgeline 280. Now turning to FIGS. 5A to 5J, a number of apparatus for attaching frame members over ridgeline 280 will be discussed.

Figure 5A:
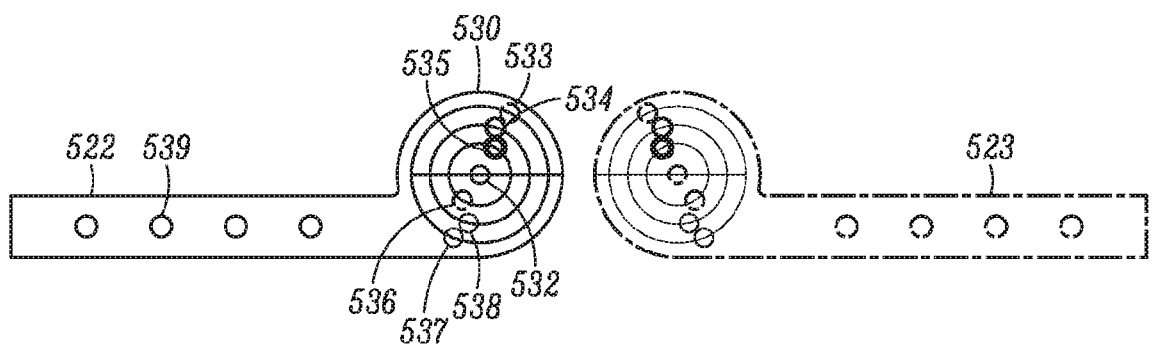
FIG. 5A is a schematic exploded view of a universal ridge bracket, according to some embodiments.
Figure 5B:
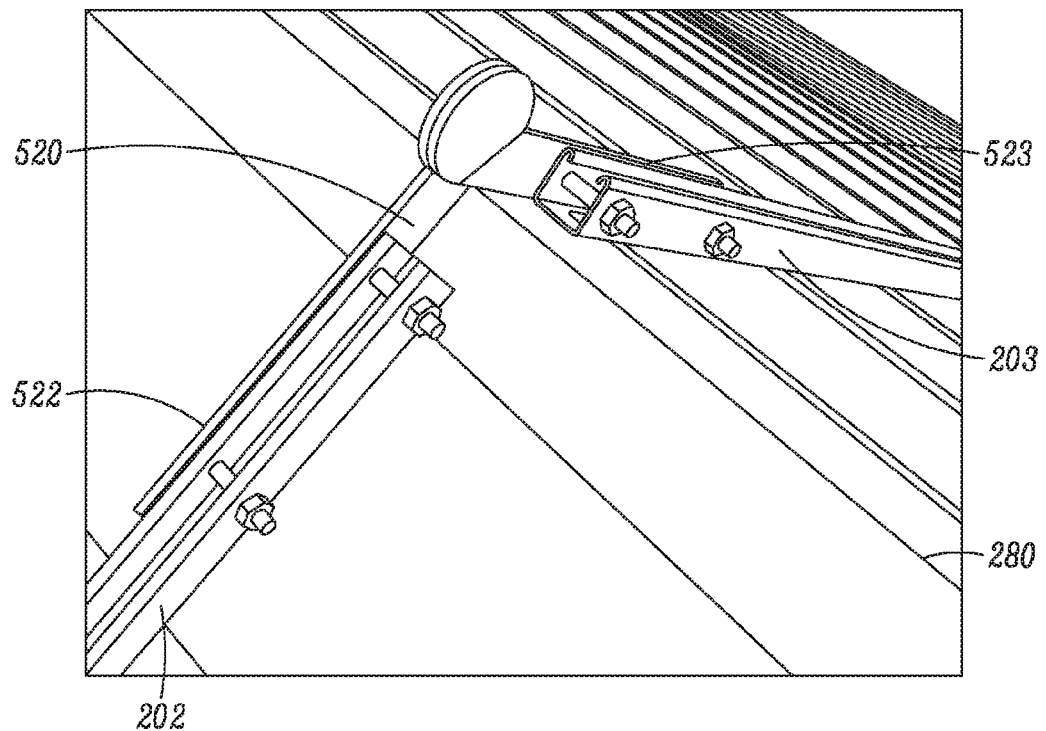
FIG. 5B is a perspective view of a universal ridge bracket installed over a roof ridge.
Figure 5C:
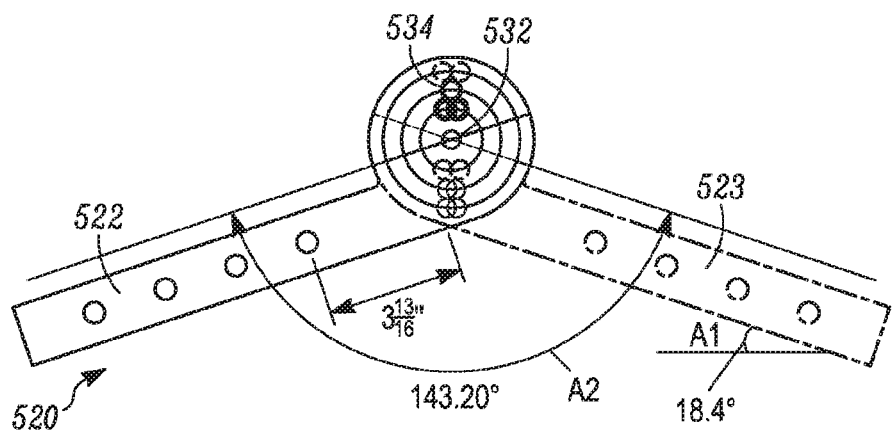
FIG. 5C is a schematic view of a universal ridge bracket set in a first position corresponding to a first pitch value, according to some embodiments.
Figure 5D:
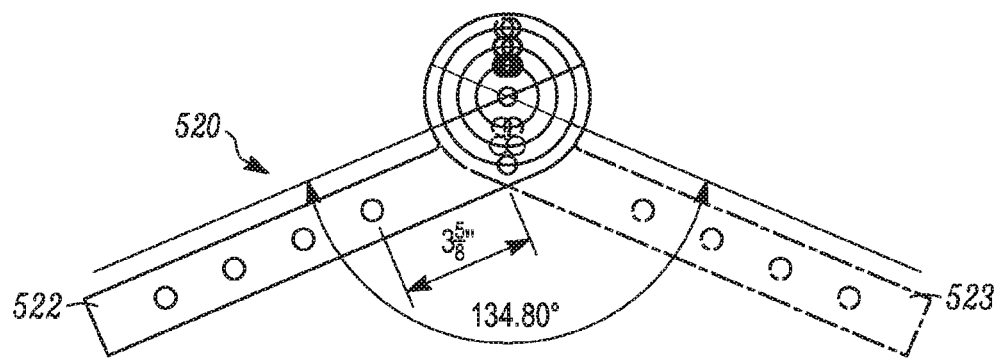
FIG. 5D is a schematic view of a universal ridge bracket set in a second position corresponding to a second pitch value, according to some embodiments.
Figure 5E:
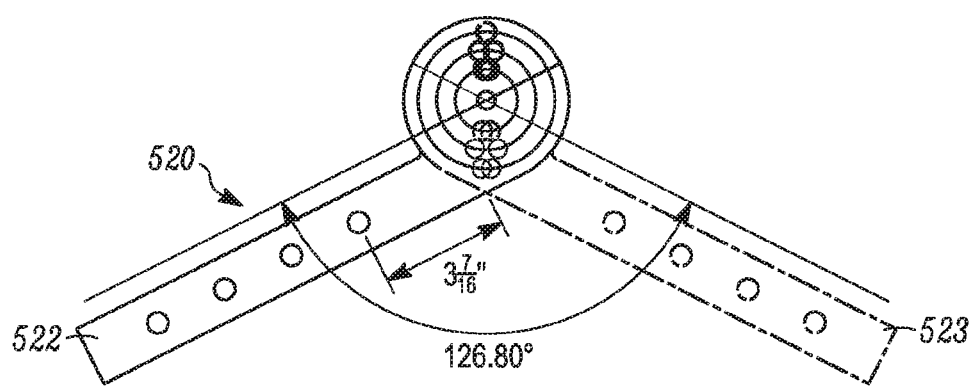
FIG. 5E is a schematic view of a universal ridge bracket set in a third position corresponding to a third pitch value, according to some embodiments.
Figure 5F:
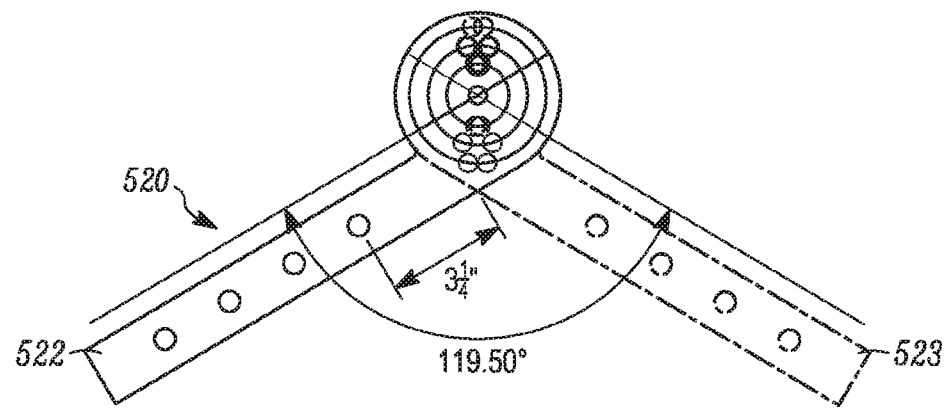
FIG. 5F is a schematic view of a universal ridge bracket set in a fourth position corresponding to a fourth pitch value, according to some embodiments.
Figure 5G:
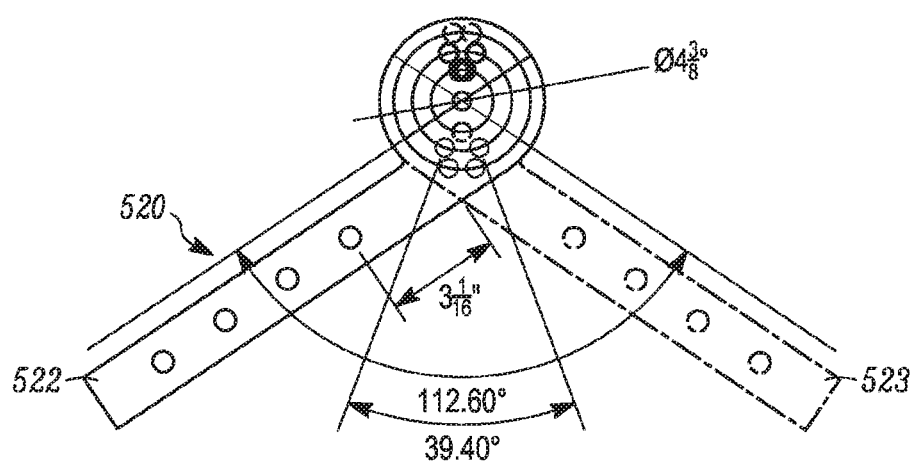
FIG. 5G is a schematic view of a universal ridge bracket set in a fifth position corresponding to a fifth pitch value, according to some embodiments.
Figure 5H:
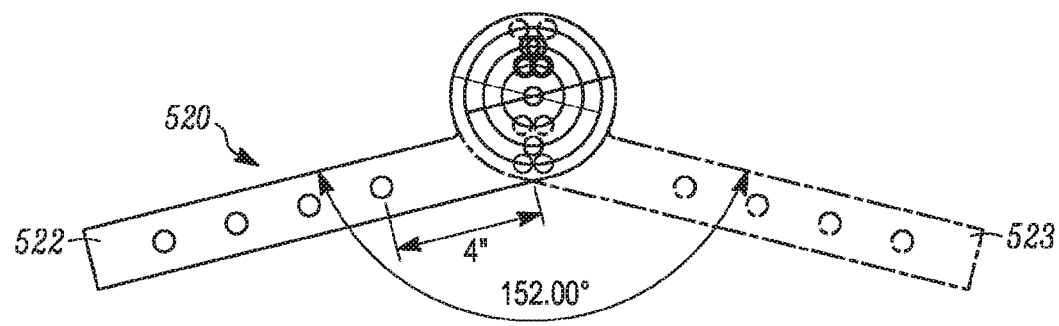
FIG. 5H is a schematic view of a universal ridge bracket set in a sixth position corresponding to a sixth pitch value, according to some embodiments.
Figure 5I:
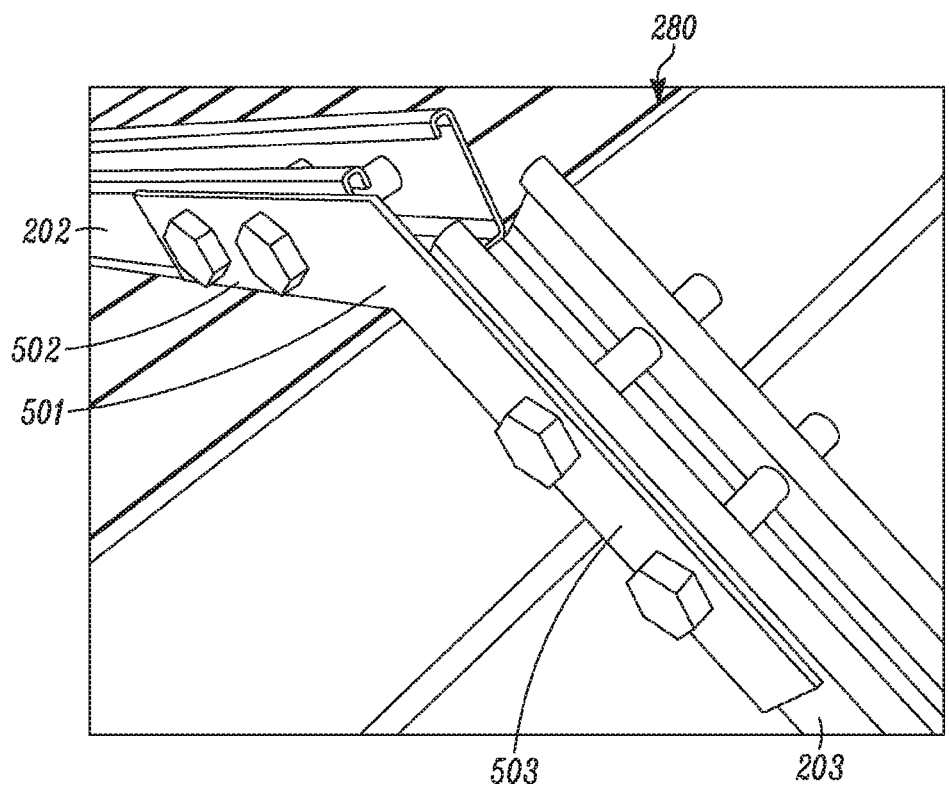
FIG. 5I is a perspective view of a side mounted ridge bracket, according to some embodiments.

FIG. 5I is a perspective view of a side mounted ridge bracket, according to some embodiments. FIG. 5I shows a fixed angle ridge bracket 501 straddling the ridgeline 280 of a roof. The fixed angle ridge bracket 501 includes a first leg 502 that attaches to a first arm 202 and a second leg 503 that attaches to the second arm 203. The first leg 502 and the second leg 503 attached to the sides of the first arm 202 and the second arm 203, respectively. The first leg 502 has openings therein which correspond to openings in the first arm 202. Similarly, the second leg 503 has openings therein which correspond to the openings in the second arm 203. The angle between the first leg 502 and the second leg 503 corresponds to the angle between the roof surfaces that intersect at the ridgeline 208. This type of fixed ridge bracket 501 is particularly useful for when a number of homes are built the same. For example, in a certain development there may be tract homes that all have roofs with the same pitch and therefore the same angles between the roof surfaces at the ridgeline 280. In this instance, the same fixed angle ridge bracket 501 can be used on all the homes having the same pitch. Installation diseased is there is no adjustment necessary.

Figure 5J:
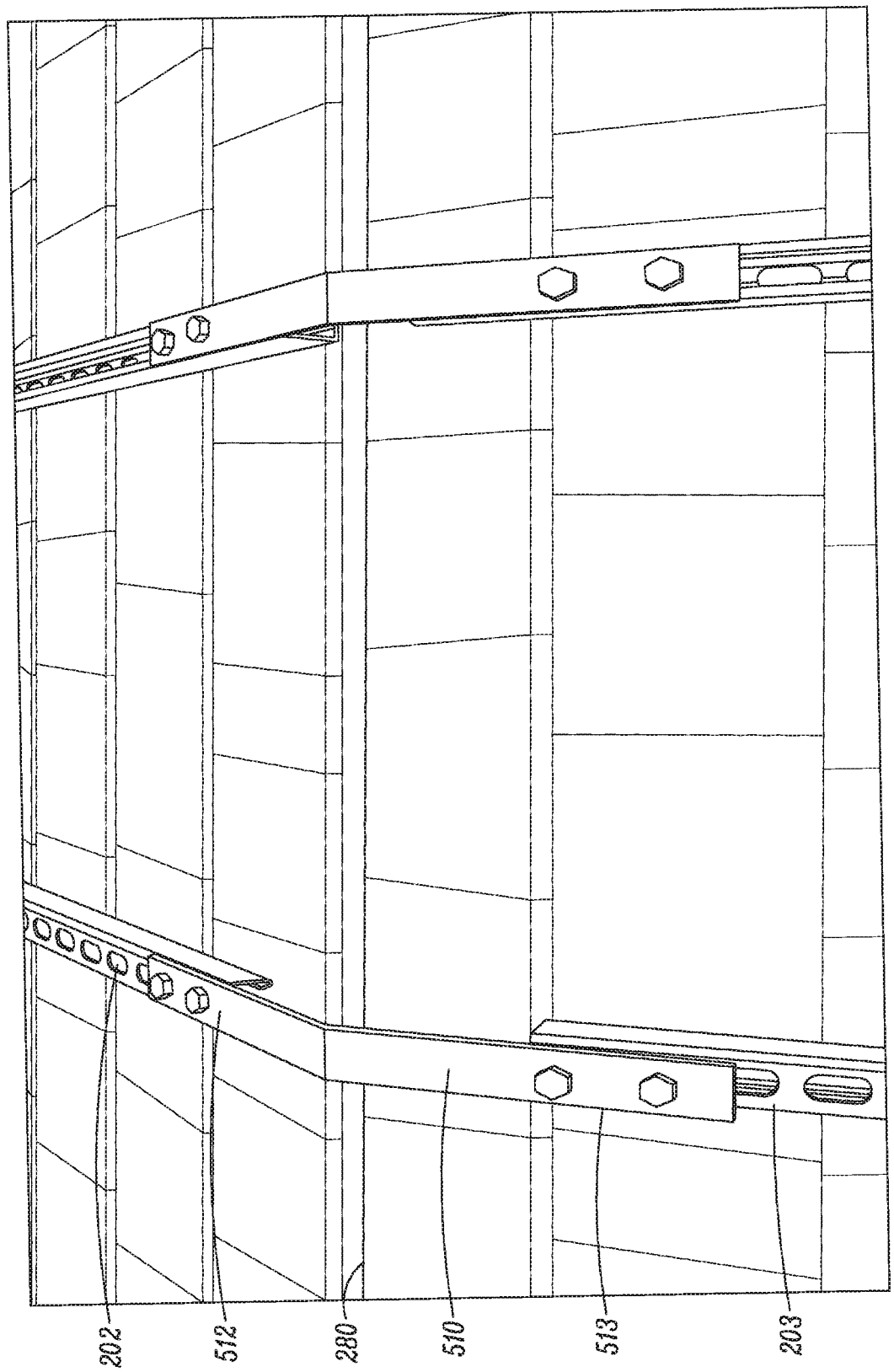
FIG. 5J is a perspective view of a top mounted ridge bracket, according to some embodiments.

FIG. 5J is a perspective view of a top mounted ridge bracket 510, according to some embodiments. Ridge bracket 510 is also a fixed ridge bracket. The main difference between ridge bracket 501 and ridge bracket 510 is that the ridge bracket 510 is attached to the top of the first arm 202 and the second arm 203. Ridge bracket 510 includes a first leg 512 that attaches to the first arm 202 and more specifically to the top of the first arm 202. The ridge bracket 510 also includes a second leg 513 that attaches to the top of the second arm 203. Again the angle between the first's leg 512 and the second leg 513 corresponds to the angle between the surfaces of the roof at the ridgeline 280. Fixed angle brackets are very good for installing many solar frame systems on many homes that have the same pitched roof, as mentioned above. Of course, there are many types of pitched roofs. With fixed angle brackets, a number of different fixed angle brackets have to be carried an inventory to accommodating installations on roofs having various pitches.

FIG. 5K is a table that shows a number of pitches used to form roof trusses or used for framing roofs in homes or other edifices. These pitches also are the pitches associated with the roofs that are placed on the trusses or the framed roof. Shown in FIG. 5K is the pitch, an angle A1 and an angle A2. Angles A1 and A2 are related to the pitch of the roof. A1 which is the angle of one of the roof surfaces with respect to horizontal line. The angle A2 is the angle between the first roof surface and the second roof surface. Therefore, for each pitch, there is a separate set of angles A1 and A2. As can be seen from the table, a frame installer would have to carry many fixed ridge brackets in stock to accommodate all the various pitches of roof that are used on homes or other edifices. It should also be noted that the table shown here is a partial table.

FIG. 5A is a schematic exploded view of a universal ridge bracket 520, according to some embodiments. The universal ridge bracket 520 is made from two substantially identical legs that are attached to one another. For the sake of discussion, the two legs of the universal ridge bracket 520 will be referred to as a first leg 522 and a second leg 523. It should be noted, however, that in the embodiment shown the first leg 522 and the second leg 523 are substantially identical. This provides a large advantage for installers of frames that hold solar panels. Among the advantages is that only one part needs to be carried an inventory to form ridge brackets that will cover a wide range of pitches of roofs. For the sake of simplicity, only one of the legs, namely the first leg 522, of the universal ridge bracket 520 will be detailed with the understanding that the second leg 523 will be substantially identical. First leg 522, includes a circular end 530 that includes a pivot opening 532 as well as additional openings 533, 534, 535, 536, 537, and 538. The additional openings 533, 534, 535, 536, 537, and 538, are positioned so that they align with similar openings in the second leg 523 when placed on a roof having a standard pitch. This will be further detailed in FIGS. 5C through 5H in the following discussion. The first leg 522 also includes a number of frame connection points 539. The openings 539 correspond to openings in the first arm 202 of the frame for carrying solar panels. Again it should be noted that in this embodiment the first leg 522 and the second leg 523 are substantially identical.

FIG. 5B is a perspective view of a universal ridge bracket 520 installed over a roof ridgeline 280. When the first leg 522 is attached to the second leg 523, the universal ridge bracket 520 is formed. The circular end 530 is positioned over the ridgeline 280 of the roof. The first leg 522 is attached to the first arm member 202. The second leg 523 is attached to the second arm member 203 of the frame. As shown the first leg 522 is attached to the side of the first arm member 202 and the second leg 523 is attached to the side of the second arm member 203. The first leg 522 of the universal ridge bracket 520 can be rotated or pivoted with respect to the second leg 523 of the universal ridge bracket 522 accommodate roofs having varying pitches. Thus, the universal ridge bracket 520 is adjustable to cover roofs having various pitches. In one embodiment, first leg 522 could be attached to the second leg 523 at the pivot opening 532. In this instance, the resulting universal ridge bracket 520 could be adjusted to correspond to a roof of any pitch. Such an installation may be needed when the roof is framed using a nonstandard pitch.

FIG. 5C is a schematic view of a universal ridge bracket 520 set in a first position corresponding to a first pitch value, according to some embodiments. FIG. 5C shows the universal ridge bracket 520 in a position corresponding to a roof pitch of 4/12. In this position the angle A2 is 143.2° and the angle A1 is 18.4°. In this position the openings 534 in the first leg 522 and in the second leg 523 align. A bolt can be placed through the pivot opening 532 in each of the legs 522, 523 and another bolt or fastener can be placed into the opening 534 of both legs 522, 523. The additional bolt or fastener in opening 534 of both legs will prevent the rotation of the first leg 522 with respect to the second leg 523. This will be useful if case of a windstorm or other similar event that may cause one side of the frame to rotate with respect to the other. In other words, the bolt passing through opening 534 counteracts any torque that may be placed on the first leg 522 or the second leg 523 of the universal ridge bracket 520.

FIGS. 5D through 5H show various positions where one or more of the openings 533, 534, 535, 536, 537 and 538 align. Of course, the pivot opening 530 will align since the first leg 522 is pivotally connected to the second leg 523. It should be noted that the legs 522 and 523 align at opening 533 when the pitch is 6/12 as shown in FIG. 5E. As shown in FIG. 5F, the opening 535 in both of the legs 522, 523 align when the brackets are placed on the roof of a 712 pitch. FIG. 5G shows the brackets placed on a roof with a 8/12 pitch. These can be compared to the table shown in FIG. 5K. Also be advised that the table in FIG. 5K does not include every possible pitch for a roof, roof truss or framed roof. There may be instances where the other openings 533, 534, 535, 536, 537 and 538 do not align on each of the two legs 522, 523. In this instance a bolt can be placed through the pivot opening 532 and the brackets can be adjusted to fit the roof over the ridgeline 280.

A modular, roof-mounted solar energy apparatus includes a mounting frame having a plurality of brackets. Each bracket having a first arm 202 connected to a second arm 203 at a connection point. The plurality of first arms 202 form a first plane. The plurality of second arms 203 form a second plane. The mounting frame carries one or more solar panels. The mounting frame also has an angled ridge bracket 520, 510, 501 further including a first end connecting to the first arm 202 positioned on one side of the ridge 280 of a roofline, and a second end for connecting to the second arm 203 positioned on the other side of the ridge 280 of the roofline. The angle between the first end or leg 502, 512, 522 and the second end or leg 503, 513, 523 substantially matches the angle of the roof at the ridgeline 280. In one embodiment, the angled ridge bracket 510, 501 has a fixed angle. In another embodiment, the fixed angle ridge bracket 510, 501 attaches to the side of the first arm 202 and the side of the second arm 203. In still a further embodiment, the fixed angle ridge bracket 510, 501 attaches to the top of the first arm 202 and the top of the second arm 203. In yet another embodiment of the angled ridge bracket 520, at least one leg 522, 523 is movable.

There is also an adjustable angle ridge bracket 520 which includes a first leg 522, and a second leg 523. The first leg 522 and the second leg 523 are pivotally attached to one another. In another embodiment, first and second leg have another opening, such as opening 533, 534, 535, 536, 537, or 538, therein for fixing an angle between the first leg and the second leg. In still a further embodiment, the first leg 522 and second leg 523 have a plurality of additional openings 533, 534, 535, 536, 537, and 538 therein for fixing first leg 522 substantially aligning with an opening in the second leg 523 when placed over a ridgeline of a roof. The openings 533, 534, 535, 536, 537, or 538 align on a roof made with a certain pitch. Most roofs are made or constructed having a selected pitch. In still a further embodiment, the first leg 522 and the second leg 523 of the angled ridge bracket 520 are substantially identical.

A roof ridge connection apparatus 520 for connecting frame members over a ridgeline of a roof includes a plate 522 that has a frame connection end, and a ridgeline connection end. The ridgeline connection end includes a pivot opening 532 and a number of additional openings 533, 534, 535, 536, 537, and 538 therein. The additional openings 533, 534, 535, 536, 537, and 538 align when two of the plates are pivotally connected and placed over a ridgeline of a roof. In one embodiment, the additional openings are positioned to align when a roof is made with a selected pitch.

Figure 6:
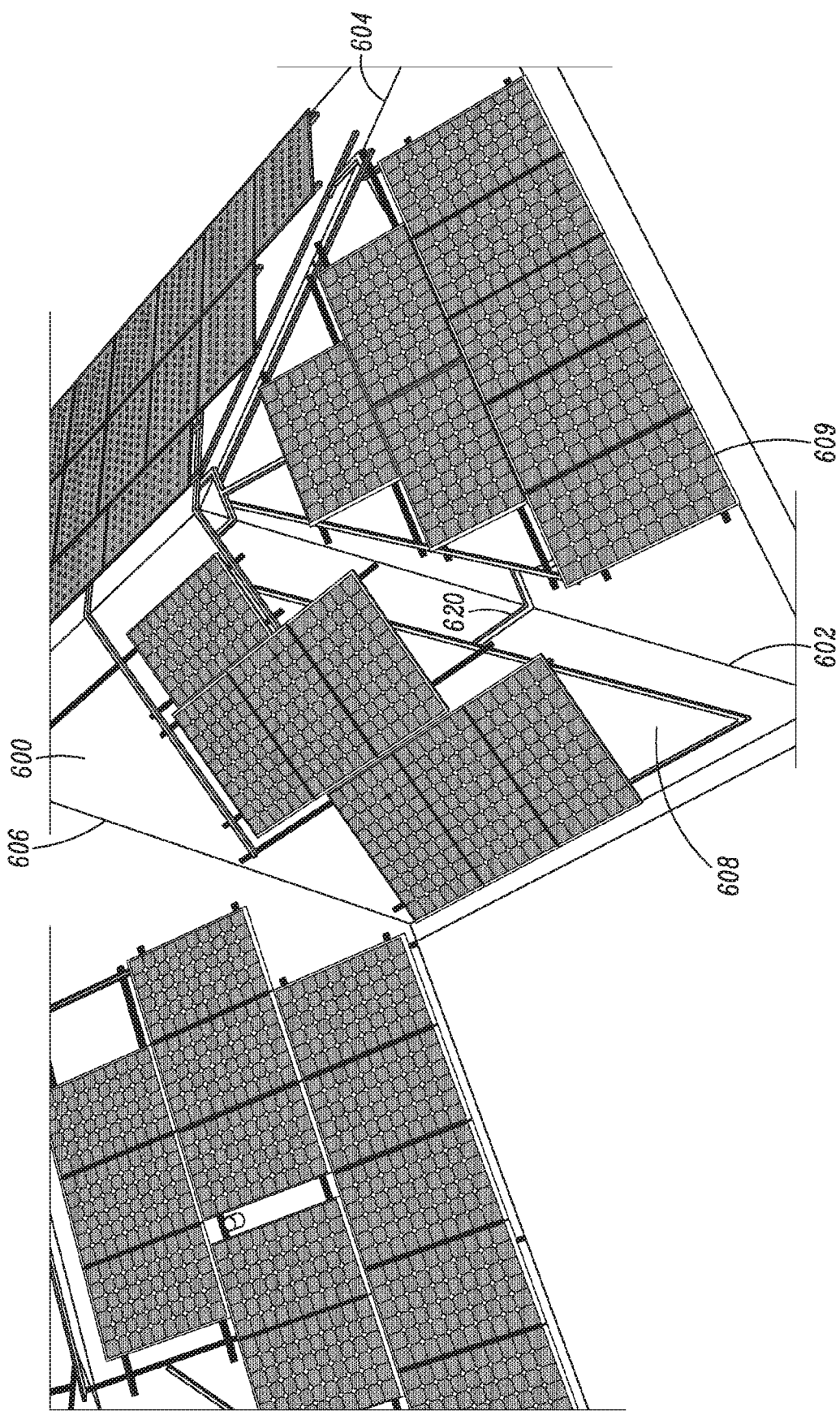
FIG. 6 is a top view of a mounting frame populated with solar panels on a hip roof that incorporates a hip roof bracket, according to some embodiments.

FIG. 6 is a top view of a mounting frame populated with solar panels on a hip roof 600 that incorporates a hip roof bracket 620, according to some embodiments. A hip roof, hip-roof or hipped roof, is a type of roof where all sides of the roof slope downwards to the walls, usually with a fairly gentle slope. Thus, a hipped roof building has no gables or other vertical sides to the roof. A hipped roof 600 is shown in FIG. 6. The hipped roof 600 includes a first hip 602, and a second hip 604, as well as a valley 606. The hip roof bracket 620 is used to tie together portions of a frame located on a first side 608 of the hip 602, and a second side 609 of the hip 602. Time portions of the frame together make it less susceptible to damage from wind or other forces. The hip roof bracket 620 straddles the hip 602 of the roof 600, Straight bars are used to connect the hip roof bracket 622 the various frame members on either side of the hip 602.

Figure 7:
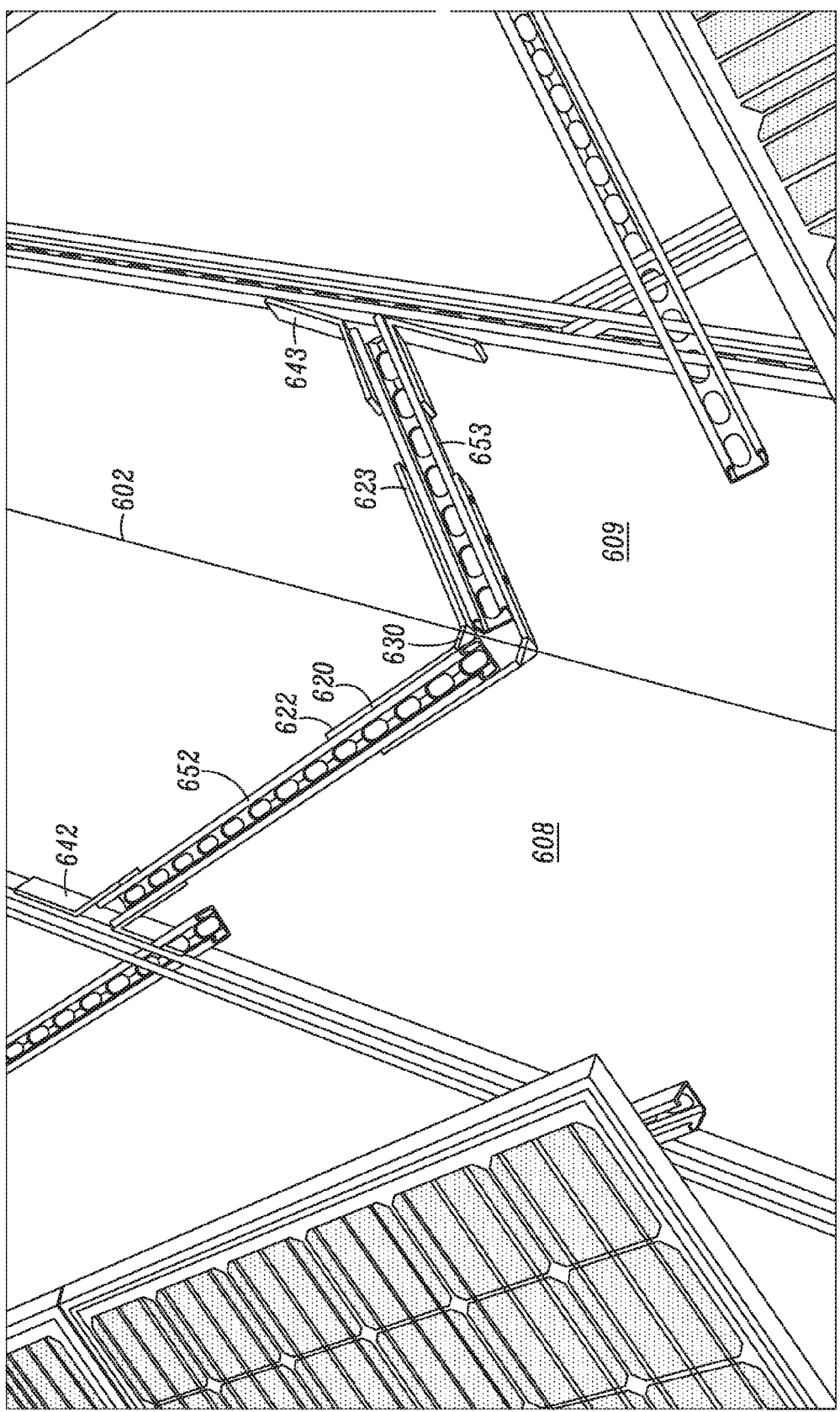
FIG. 7 is a top closeup view of the hip roof bracket as installed in FIG. 6, according to some embodiments.
Figure 8:
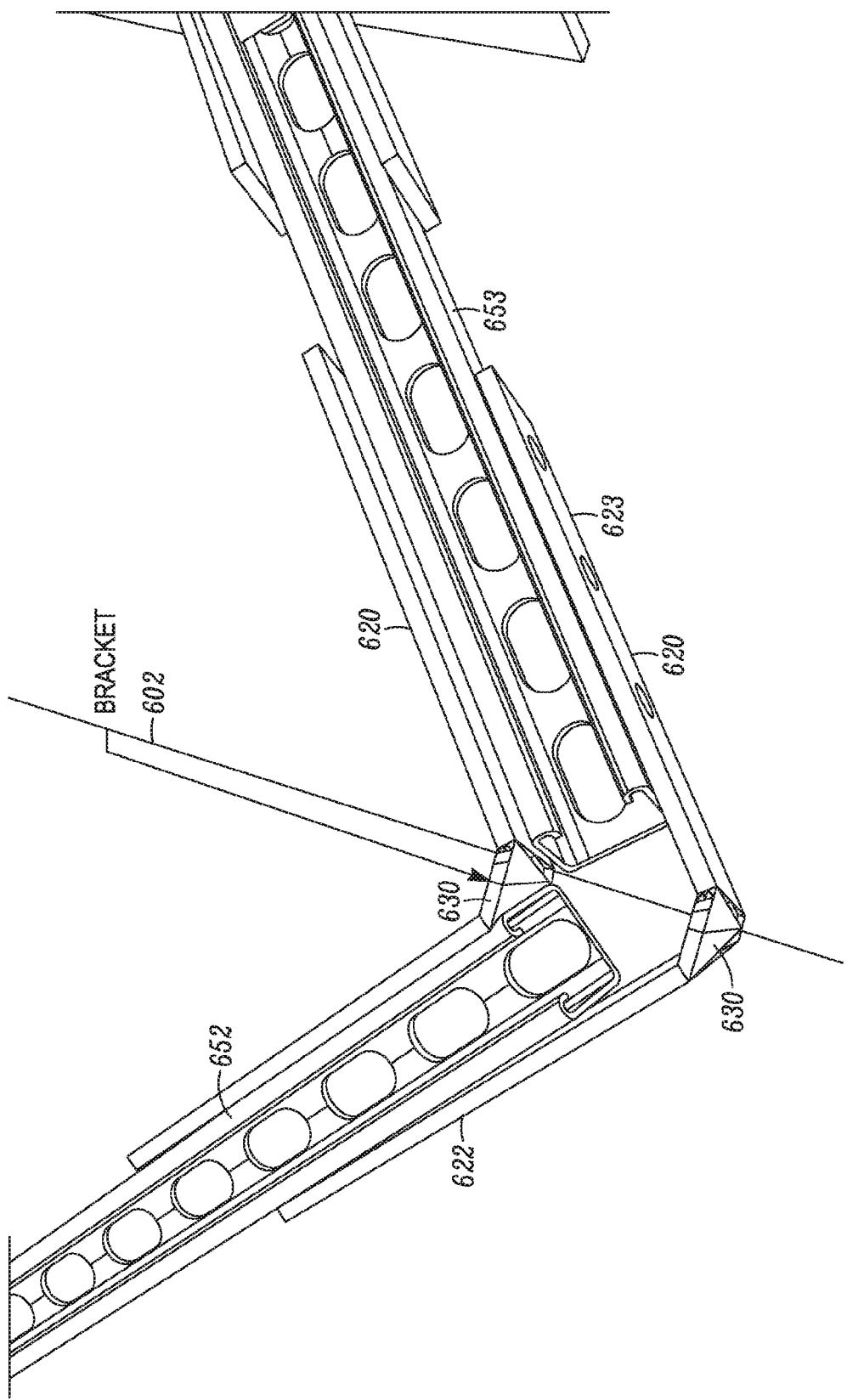
FIG. 8 is a top closeup view of the hip roof bracket, according to some embodiments.
Figure 9:
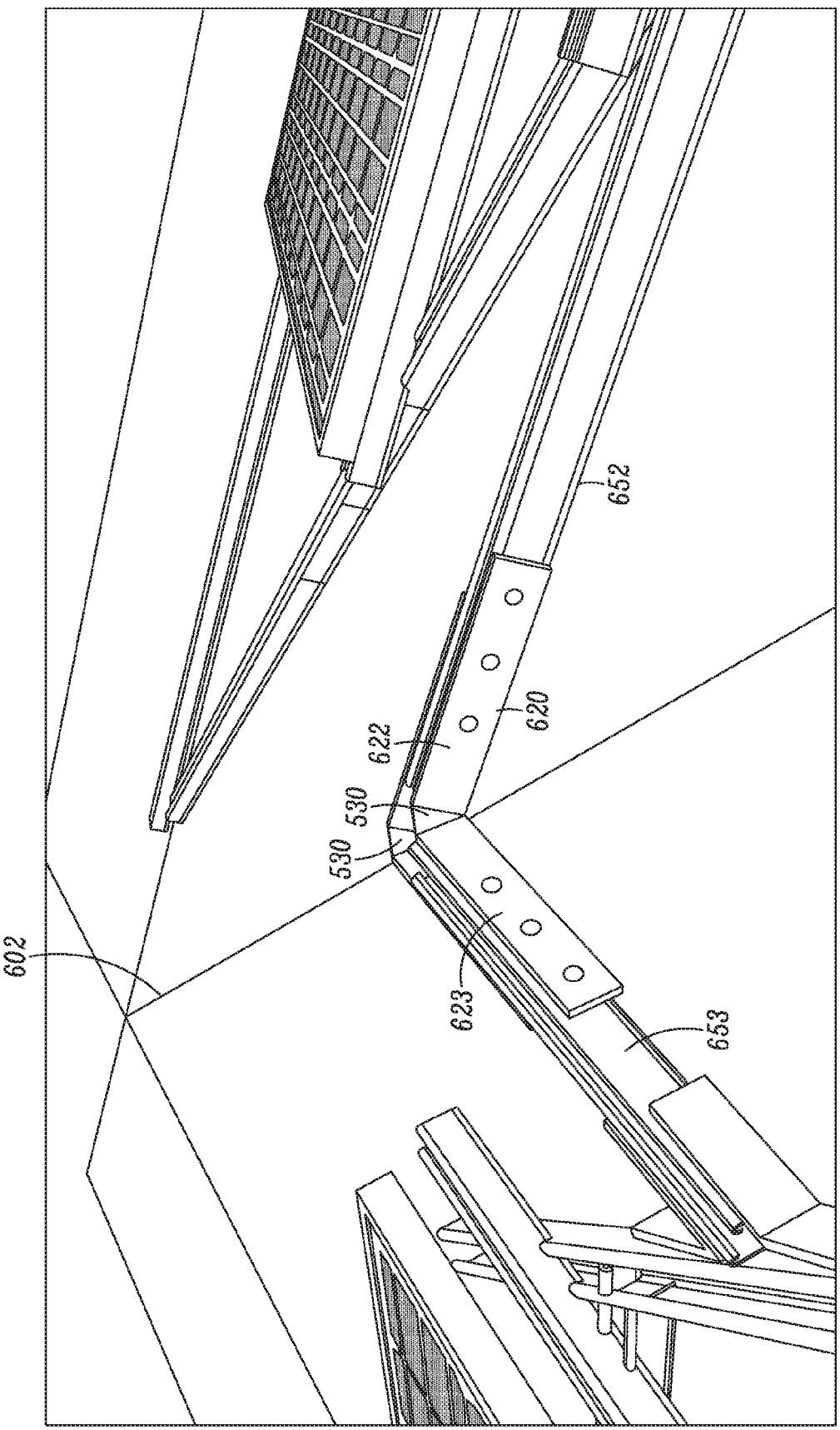
FIG. 9 is a view of a hip roof bracket shown in FIG. 8 as seen from the top of the roof looking toward the eaves, according to some embodiments.

FIG. 7 is a top closeup view of the hip roof bracket 620 as installed in FIG. 6, according to some embodiments. FIG. 8 is a top closeup view of the hip roof bracket shown in FIG. 6, according to some embodiments. FIG. 9 is a view of a hip roof bracket shown in FIG. 8 as seen from the top of the roof looking toward the eaves, according to some embodiments. The details of the hip roof bracket 620 and the installation will be discussed with respect to FIGS. 7 through 9. A modular, roof-mounted solar energy apparatus includes a mounting frame for a hipped roof 600 having a plurality of brackets each having a first arm 202 connected to a second arm 203 at a connection point wherein the plurality of first arms 202 form a first plane and the plurality of second arms 203 form a second plane, at least a first frame member placed on a first roof surface 608 on one side of a hip 602 of the roof and a second frame member placed on a second roof surface 609 on the other side of the hip 602 of the roof 600. The frame carries one or more solar panels. The frame also includes an angled hip bracket 620. The angled hip bracket 620 further includes a first wing 622 connecting to the first frame member on the first roof surface 608 on one side of the hip 602, and a second wing 623 connecting to the second frame member on the second roof surface 609 on the other side of the hip 602. The hip roof bracket 620 also includes a wedge-shaped element 630 positioned between the first wing 622 and the second wing 623 of the angled hip bracket 620 to set the angle between the first wing 622 and the second wing 623. The frame further includes a first angled connector bracket 642 connected to the first fame member, and a second angled connector bracket 643 connected to the second fame member. A first bar 652 connects the first wing 622 of the angled hip bracket 620 to the first angled connector bracket 642 of the first frame member on one side of the hip 602. A second bar 653 connects the second wing 623 of the angled hip bracket 620 to the second angled connector bracket 643 of the second frame member on other side of the hip 602. In one embodiment, at least one angled hip roof bracket 620 is attached to one side of a first bar 652 for connecting to the first frame member and is attached to one side of a second bar 653 for connecting to the second frame member. In another embodiment, a first angled hip roof bracket 620 is attached to one side of a first bar for connecting to the first frame member and is attached to one side of a second bar for connecting to the second frame member, and a second hip roof bracket 620 bracket is attached to an other side of a first bar for connecting to the first frame member and is attached to an other side of a second bar for connecting to the second frame member. In still another embodiment, the at least one angled hip roof bracket 620 is attached to a top side of a first bar 652 for connecting to the first frame member and is attached to a top side of a second bar 653 for connecting to the second frame member.

Advantages of the solar photovoltaic power systems described herein are realized further realized in their "plug-and-play" capability, wherein prefabricated modular systems can be quickly and efficiently installed on virtually any rooftop and immediately begin delivering or storing power. Examples of such "Plug-and-play" devices can be found in co-owned U.S. Patent Application 20110308574 A1 titled "SOLAR POWERED ELECTRICAL GENERATION DEVICE AND RELATED METHODS", the disclosure of which is herein incorporated by reference.

The invention claimed is:

1. A modular, roof-mounted solar energy apparatus comprising:
   a mounting frame having:
      a plurality of brackets each having a first arm connected to a second arm at a connection point, wherein a plurality of the first arms forms a first plane and a plurality of the second arms forms a second plane; and
   an angled ridge bracket further comprising:
      a first end connecting to one of the first arms positioned on one side of a ridge of a roofline; and
      a second end for connecting to one of the second arms positioned on another side of the ridge of the roofline, the angle between the first end and the second end substantially matching the angle of a roof at the ridge of the roofline.

2. The apparatus of claim 1, wherein the angled ridge bracket has a fixed angle.

3. The apparatus of claim 2, wherein the fixed angle ridge bracket attaches to a side of one of the first arms and a side of one of the second arms.

4. The apparatus of claim 2, wherein the fixed angle ridge bracket attaches to a top of one of the first arms and a top of one of the second arms.

5. The apparatus of claim 1, further comprising one or more solar panels attached to the mounting frame.

\* \* \* \* \*